United States Patent [19]
Rodrigues et al.

[11] Patent Number: 5,962,811
[45] Date of Patent: Oct. 5, 1999

[54] CABLE SPLICE ENCLOSURE

[75] Inventors: Julio F. Rodrigues, Collierville; Glen Ellis, Memphis, both of Tenn.; Gary Lowery, Southaven, Miss.

[73] Assignee: Thomas & Betts Corporation, Memphis, Tenn.

[21] Appl. No.: 08/430,659

[22] Filed: Apr. 28, 1995

[51] Int. Cl.⁶ .......................... H02G 15/02; H02G 15/06
[52] U.S. Cl. .................. 174/76; 174/92; 174/93
[58] Field of Search .................. 174/92, 93, 138 F, 174/77 R, 76; 439/709; 156/48, 49, 50

[56] References Cited

U.S. PATENT DOCUMENTS

| | | |
|---|---|---|
| 1,688,693 | 10/1928 | Eby . |
| 1,835,922 | 12/1931 | Zeiss et al. .............................. 156/48 |
| 2,862,042 | 11/1958 | Bollmeier .................................. 174/93 |
| 3,138,657 | 6/1964 | Wengen .................................... 174/92 |
| 3,445,580 | 5/1969 | Lusk ........................................ 174/12 |
| 3,598,900 | 8/1971 | Drake .................................. 174/138 F |
| 3,823,250 | 7/1974 | De Monsy et al. .................. 174/23 R |
| 3,848,074 | 11/1974 | Channell .............................. 174/38 X |
| 3,992,569 | 11/1976 | Hankins et al. .......................... 174/92 |
| 4,025,717 | 5/1977 | Whittingham ........................ 174/88 C |
| 4,033,800 | 7/1977 | Ollis ........................................ 156/48 |
| 4,209,352 | 6/1980 | Diaz et al. ................................ 156/48 |
| 4,252,583 | 2/1981 | Garner .................................... 156/48 |
| 4,337,374 | 6/1982 | Smith .................................. 174/138 F |
| 4,423,918 | 1/1984 | Filreis et al. .......................... 339/97 P |
| 4,550,965 | 11/1985 | Izraeli .................................. 339/47 R |
| 4,554,401 | 11/1985 | Ball ........................................ 174/37 |
| 4,647,719 | 3/1987 | Campbell et al. ........................ 174/93 |
| 4,648,919 | 3/1987 | Diaz et al. ................................ 156/48 |
| 4,685,981 | 8/1987 | Dienes .................................... 156/48 |
| 4,724,278 | 2/1988 | Smith .................................. 174/38 X |
| 4,740,653 | 4/1988 | Hellbusch ............................ 174/21 R |
| 4,830,688 | 5/1989 | Staral ...................................... 156/48 |
| 4,875,952 | 10/1989 | Mullin et al. ............................ 156/48 |
| 4,933,512 | 6/1990 | Nimiya et al. ............................ 174/92 |
| 5,001,300 | 3/1991 | Messelhi .................................. 174/87 |
| 5,107,077 | 4/1992 | Fox et al. ............................ 174/138 F |
| 5,251,373 | 10/1993 | DeCarlo et al. .......................... 29/870 |
| 5,371,323 | 12/1994 | Schneider et al. ........................ 174/92 |
| 5,382,756 | 1/1995 | Dagan ...................................... 174/92 |
| 5,561,268 | 10/1996 | Dagan et al. ............................. 174/92 |

FOREIGN PATENT DOCUMENTS

| | | |
|---|---|---|
| 1 080 181 | 4/1960 | Germany . |
| 3229595 | of 1984 | Germany ................................ 174/93 |
| 3229619 | of 1984 | Germany ................................ 174/93 |
| 713597 | 9/1966 | Italy .................................. 174/138 F |

OTHER PUBLICATIONS

Instruction Book Bulletin, "8980 Series/4462/Gella™ Reenterable Splice Encapsulation Kits", Apr. 1987, by Minnesota Mining & Manufacturing Co.

Installation Data, "Installation Data DP–600 Combination Splice Closure", Feb., 1993, by Keptel, Inc.

*Primary Examiner*—Kristine Kincaid
*Assistant Examiner*—Chau N. Nguyen
*Attorney, Agent, or Firm*—Hoffman & Baron, LLP

[57] ABSTRACT

An electrical splice enclosure for enclosing a splice of an electrical cable. The splice enclosure includes an enclosure housing. The housing is formed of a lower housing portion and a cover portion defining a bounded interior therein. The lower housing portion includes a bottom surface, an upwardly extending wall bounding the bottom surface and an open upper surface opposite the bottom surface. The lower housing portion further includes a cable entry opening through the wall for permitting entry of the cable into the lower housing portion. The cover portion is positionable over the open upper surface of the lower housing portion so as to enclose the cable splice within the enclosure housing. The cover portion and the wall each include an encapsulant fill opening for permitting the housing interior to be gravity filled with a curable encapsulant, with the housing being positioned in multiple different positions.

29 Claims, 7 Drawing Sheets

CABLE SPLICE ENCLOSURE

FIELD OF THE INVENTION

The present invention relates generally to an enclosure for housing an electrical cable splice. More particularly, the present invention relates to a forced encapsulation enclosure for a buried cable splice.

BACKGROUND OF THE INVENTION

In order to provide telephone service for local distribution such as an individual subscriber's premises, it is necessary to run an individual telephone cable (drop wire) from the main branch of a multi-conductor telecommunications cable to the individual premises. Many of these multi-conductor telecommunications cables are run underground and, accordingly, the individual drop wires are also run underground from the branch cable to the individual premises. As the drop wires are buried beneath the ground, typically at a depth of between two and three feet, it is not uncommon for the buried drop wire to become damaged or severed due to routine excavation. Repair of the drop wire so damaged is typically accomplished by splicing the damaged ends together, thereby reestablishing electrical continuity therebetween. However, as the cable including the newly spliced location must be re-buried beneath the ground, it is necessary to adequately protect the cable splice from inherent underground moisture.

Various splice enclosures have been developed which house an electrical cable splice and also permit the enclosure to be filled with a moisture-resistant encapsulant which surrounds the cable splice, preventing moisture contact therewith. Many of these cable splice enclosures include a container-like lower housing which permits entry of two or more cable ends thereinto and which also support the spliced cable ends. The lower housing may then be filled with an encapsulant which substantially surrounds the cable splice and over time, hardens to either a gel-like or solid consistency. A cover is then placed over the lower housing, fully enclosing the cable splice. The enclosure is then buried underground, re-establishing telecommunication service to the premises. Examples of this type of buried splice enclosure are shown in U.S. Pat. Nos. 4,337,374; 4,423,918; 5,001,300 and 5,371,323.

Common to the enclosures described in each of the above-identified patents is the need to fill the lower housing of the enclosure containing the splice with the encapsulant and then interpose the cover over the filled lower housing in order to fully enclose the splice. As may be appreciated, these cable splices are made in the field, typically with the installer working adjacent to or within a hole dug in the ground to access the cable. In order to effectively encapsulate the splice with the encapsulant in many instances, the installer must hold the lower housing level while the housing is being filled with encapsulant. Thereafter, the cover must be attached to the lower housing before the enclosure is placed back beneath the ground. The risk of spillage is inherent in this process. Spillage would result in an inadequate amount of encapsulant being retained in the enclosure, and therefore may adversely affect the moisture resistance of the enclosure.

Other cable splice enclosures include two half-shells where the encapsulant is provided in the upper and/or lower half of the splice enclosure. The splice must be set in the encapsulant in the half shell. It is also difficult to carefully manipulate this type of enclosure in the field. Examples of this type of enclosure are shown in U.S. Pat. Nos. 4,550,465 and 4,423,418.

Still other cable splice enclosures are known which include two-part enclosure housings which are assembled around the splice prior to filling the enclosure with the encapsulant. U.S. Pat. Nos. 3,138,657; 3,992,569 and 4,554,401 each provide cable splice enclosures including an opening which permits the introduction of the encapsulant therethrough. However, one inherent problem with enclosures of this type is that upon injecting the encapsulant into the enclosure, there is a tendency for the encapsulant to exit the enclosure through and along the cable entry openings of the enclosure. This may result in an inadequate amount of encapsulant being contained within the enclosure and also prevents a pressure buildup within the enclosure. Such pressurization is advantageous in assuring the complete encapsulation of the splice.

It is therefore desirable to provide a forced encapsulation closure for a buried splice cable which may be more easily filled with an encapsulant and which adequately retains the encapsulant therein, thereby assuring complete encapsulation of the splice.

SUMMARY OF THE INVENTION

It is an object of the present invention to provide an encapsulation closure for a cable splice.

It is a further object of the present invention to provide a forced encapsulation closure for a buried cable splice.

It is a still further object of the present invention to provide a method and apparatus for encapsulating an electrical cable splice in an enclosure where the enclosure may be easily and reliably filled with an encapsulant.

It is yet another object of the present invention to provide an improved seal for sealing the cable entry openings of an encapsulated cable splice enclosure.

In the efficient attainment of these and other objects, the present invention provides an electrical splice enclosure for enclosing a splice of an electrical cable. The splice enclosure includes an enclosure housing. The housing is formed of a lower housing portion and a cover portion defining a bounded interior therein. The lower housing portion includes a bottom surface, an upwardly extending wall sounding the bottom surface and an open upper surface opposite the bottom surface. The lower housing further includes a cable entry opening through the wall for permitting entry of the cable into the lower housing portion. The cover portion is positionable over the open upper surface of the lower housing portion so as to enclose the cable splice within the enclosure housing. The cover portion and the wall each include an encapsulant fill opening for permitting the housing interior to be gravity filled with a curable encapsulant, with said housing being positioned in multiple different positions.

As more specifically described by way of the preferred embodiment herein, the apparatus of the present invention includes each of the fill openings being positioned in different non-coplanar, non-parallel surfaces of the enclosure, so that the enclosure may be positioned with one of the fill opening surfaces being generally positioned as at raised surface to permit the encapsulant to be introduced therethrough, to fill the enclosure and surround the splice.

Further, a closed cell foam structure including a pair of matable foam elements is positionable adjacent the cable entry opening so as to surround the cable ends, sealing the cable entry opening and preventing excess encapsulant from escaping from the enclosure.

The cable fill openings may be closed with a plug which is frictionally inserted thereinto to completely enclose and encapsulate the cable splice. The plug is retained in the opening by friction as well as by being surrounded by the encapsulant.

In its method aspect, the present invention provides a method of encapsulating an electrical cable splice. The method includes the steps of enclosing the cable splice in a splice enclosure. The splice enclosure includes at least two encapsulant-introducing openings. The openings extend through separate non-coplanar, non-parallel surfaces of the enclosure. The method further includes positioning the enclosure so that one of the opening surfaces is generally defined as a raised surface of the enclosure, and introducing a curable encapsulant into the enclosure through the raised surface opening. The curable encapsulant fills the enclosure, thereby completely encapsulating the splice contained therein.

As shown by way of the preferred embodiment herein, the method of the present invention includes positioning a closed cell foam structure adjacent a cable entry opening of the enclosure. The closed cell foam structure includes a frangibly removable slug, which is removed to define an opening which permits cable passage therethrough.

DETAILED DESCRIPTION OF THE PREFERRED EMBODIMENT

The present invention is used to enclose a splice between conductors of electrical cables such as telecommunications cables and to retain a curable encapsulant within the enclosure about the cable splice.

Figure 1:
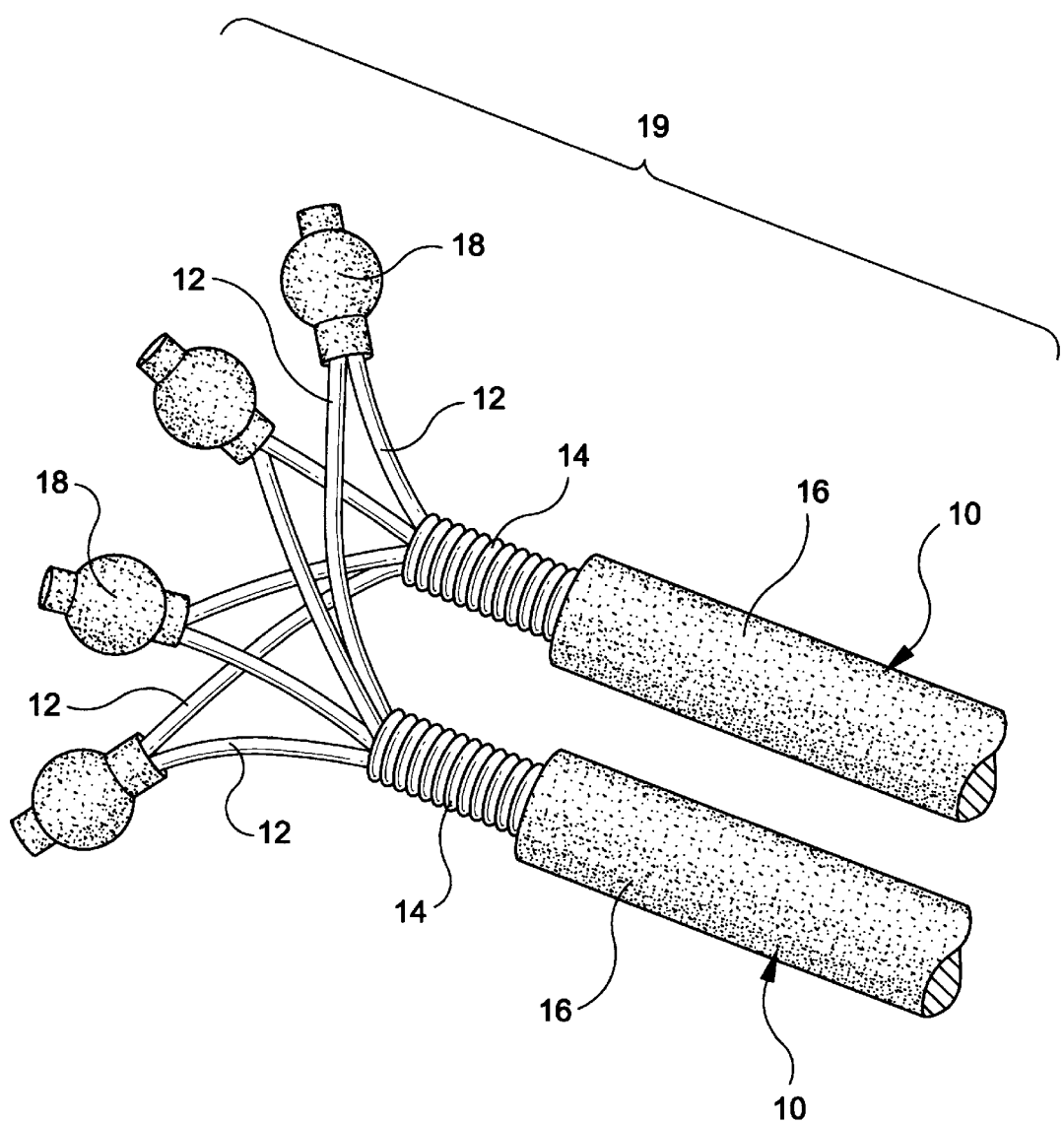
FIG. 1 is a perspective showing of a pair of multi-conductor electrical cables, the individual conductors of which are spliced together.

Referring to FIG. 1, a pair of telecommunications cables 10 are shown. Cables 10 may represent either two separate cables which are to be electrically joined or the ends of a severed electrical cable. For ease of description, both cable ends will be described as cable(s) 10. Each cable 10 includes a plurality of electrical conductors 12 extending therethrough. A metallic conductive ground shield 14 surrounds the conductors and an outer insulative jacket 16 surrounds the ground shield 14.

Cables 10 are designed for providing telecommunication service from a larger multi-conductor cable (not shown) to an individual subscriber's premises in underground applications. These types of cables are commonly referred to as drop wires. In order to establish electrical connection between the conductors 12 of cables 10 where such service may have been interrupted, the individual conductors 12 are electrically spliced together. In order to effect splicing of cables 10, the cables are prepared by stripping back a portion of the insulative jacket 16, exposing an extent of ground shield 14 and allowing a length of conductors 12 to extend therethrough. The individual conductors are spliced together using conductor splices 18. The electrical inter-connection of cables 10 is commonly referred to as a cable splice 19 and the technique for assembling such a splice is well known in the telecommunications art. As is common in the formation of cable splices, the cables 10 may be spliced together in side-by-side fashion such as shown in FIG. 1. This is referred to as a "butt-splice". It is also common for the cables 10 to be spliced together with the cable extending in a single line. This is referred to as an "in-line splice" (not shown). The present invention is designed to accommodate either type of cable splice.

Once the telecommunication signal is reestablished between cables 10, the splice 19 must be re-buried underground. In order to ensure that moisture and other contaminants do not adversely affect the splice, splice 19 may be housed in a protective splice enclosure.

Figure 2:
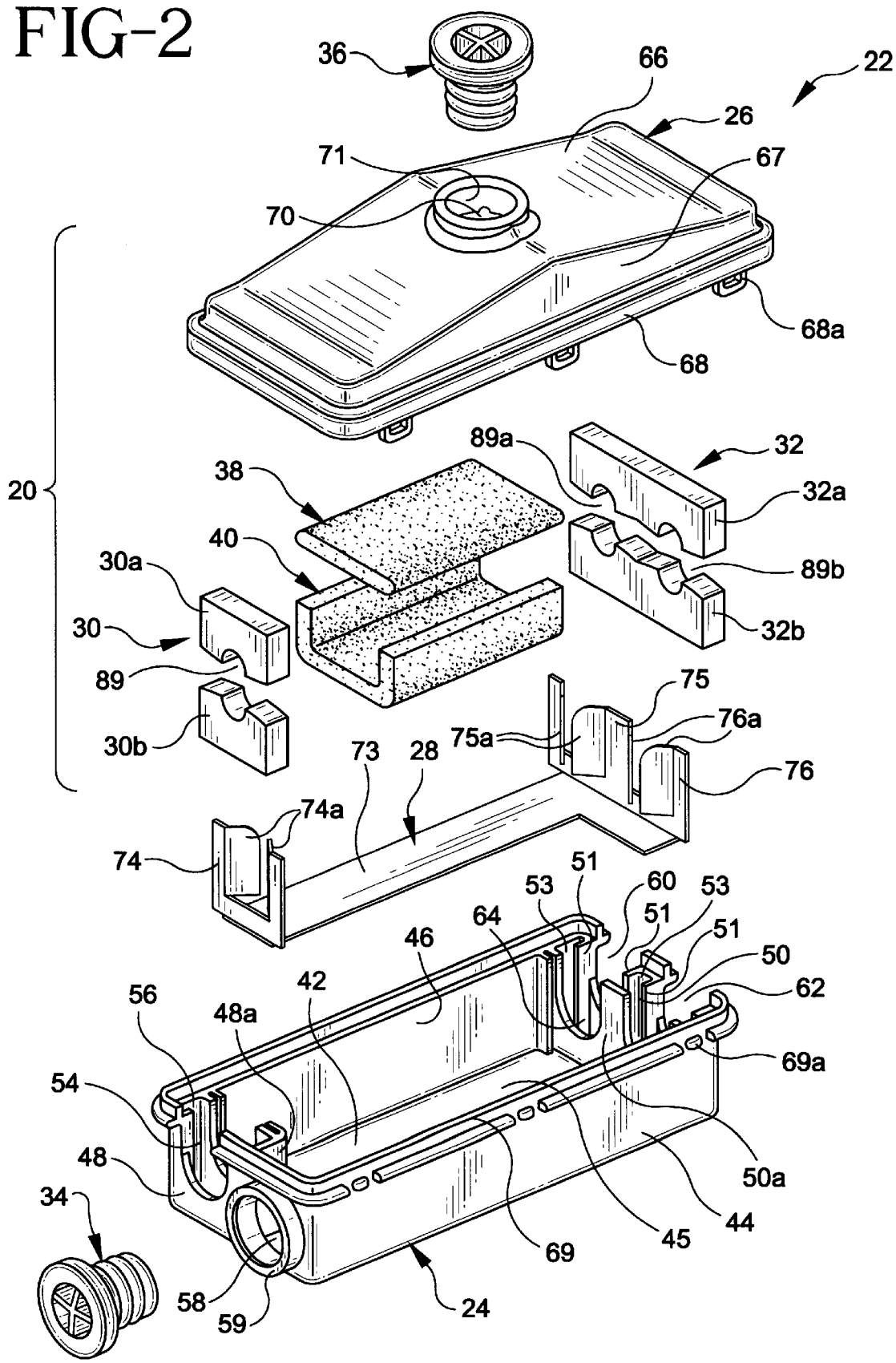
FIG. 2 is an exploded perspective showing of the buried splice enclosure of the present invention.

Referring additionally to FIG. 2, a buried cable splice enclosure 20 of the present invention is shown. Enclosure 20 comprises a generally elongate rectangular enclosure housing 22 including a lower housing portion 24 and a cover 26 removably positioned thereover. Enclosure housing 22 may be formed of a suitable molded insulative plastic, preferable polypropylene, which is generally water resistant. Enclosure housing 22 is designed to accommodate splice 19 and a curable encapsulant 21 (FIG. 3) which is introduced thereinto to surround and protect splice 19.

Enclosure 20 further includes an elongate ground bar 28, multi-part end seals 30 and 32 and plugs 34 and 36 forming part of enclosure housing 22. Optionally, enclosure 20 may further include web-like spacer members 38 and 40. Each of these components will be discussed in further detail hereinbelow.

Lower housing portion 24 includes an elongate, generally planar bottom surface 42 which is perimetrically bounded by a pair of opposed elongate side walls 44 and 46 and opposed transverse end walls 48 and 50. Lower housing portion 24 defines a bounded housing interior 45 for accommodation of splice 19 and encapsulant 21.

End wall 48 of lower housing portion 24 includes a generally upwardly opening U-shaped cable entry opening 54 extending therethrough. Cable entry opening is positioned adjacent a seal retaining slot 56, defined by end wall 48 and a partition wall 48a. As will be described in further detail hereinbelow, slot 56 accommodates end seal 30 therein. End wall 48 further includes a generally circular encapsulant fill opening 58 extending therethrough adjacent cable entry opening 54. Fill opening 58 is defined by a generally annular housing wall or collar 59 therearound. As will be further described hereinbelow, plug 34 is used to close encapsulant fill opening 58.

Opposed end wall 50 includes a pair of side-by-side upwardly opening U-shaped cable entry openings 60 and 62 extending therethrough. Cable entry openings 60 and 62 are positioned adjacent an elongate seal retaining slot 64 spanning both side by side cable entry openings 60 and 62. Slot 64, which is defined by end wall 50 and an elongate partition wall 50a, accommodates end seal 32 therein as will be described in further detail hereinbelow. The number and position of cable entry openings 54, 60 and 62 permit either an inline or butt splice 19 to be accommodated in enclosure 20.

Cover 26 is generally an elongate planar member having an upper cover surface 66 including a raised central crown 67. Cover 26 further includes a perimetrical skirt 68 depending from and extending around planar surface 66. Skirt 68 is engagable with an upwardly extending lip 69 of lower housing portion 24 so as to provide interfitting sealed engagement therebetween. Securement of cover 26 to lower housing portion 24 is achieved by providing an appropriate latching mechanism. In the present illustrative embodiment, the latching mechanism includes lower housing 24 having a plurality of protrusions 69a adjacent lip 69 which are engagable with depending latches 68a extending from skirt 68 of cover 26. The protrusions and latches may be positioned on the end walls, side walls, or both. However, it may be appreciated that any other conventional mechanism may also be employed.

Cover 26 includes an encapsulant fill opening 70 extending through planar surface 66. Encapsulant fill opening 70 is centrally located and defined by annular cover wall or collar 71 therearound. As will be described in further detail hereinbelow, plug 36 is used to close encapsulant fill opening 70.

Elongate ground bar 28 is supported within lower housing 24 and extends between end walls 48 and 50. Ground bar 28 is an elongate member formed of suitably conductive metal, preferably brass. Ground bar 28 includes an elongate central bridge portion 73 having a shield accommodating member 74 at one end and a pair of shield accommodating members 75 and 76 at the other end. Shield accommodating member 74 is positioned adjacent cable entry opening 54, while shield accommodating members 75 and 76 are positioned respectively adjacent cable entry openings 60 and 62. Each of shield member 74, 75 and 76 includes inwardly directed pairs of opposed fingers 74a, 75a and 76a, which are designed to frictionally accommodate the ground shields 14 of cables 10 therebetween. In this manner, ground continuity between ground shields 14 may be established in either an inline or butt splice.

Optionally supported in enclosure 20 are web-like spacer members 38 and 40. Each of spacer members 38 and 40 are open cell webs of fibrous insulative material which are designed and positioned to space splice 19 away from the internal walls forming enclosure 20. Spacer members 38 and 40 are foraminous so as to permit flow of encapsulant 21 (FIG. 3) therethrough. This allows the encapsulant 21 to completely surround cable splice 19 positioned within enclosure 20. Lower spacer member 40 is generally troughshaped and may be adhesively attached to bottom surface 42, while planar spacer member 38 may be similarly adhesively attached to the undersurface of cover 26.

Figure 4:
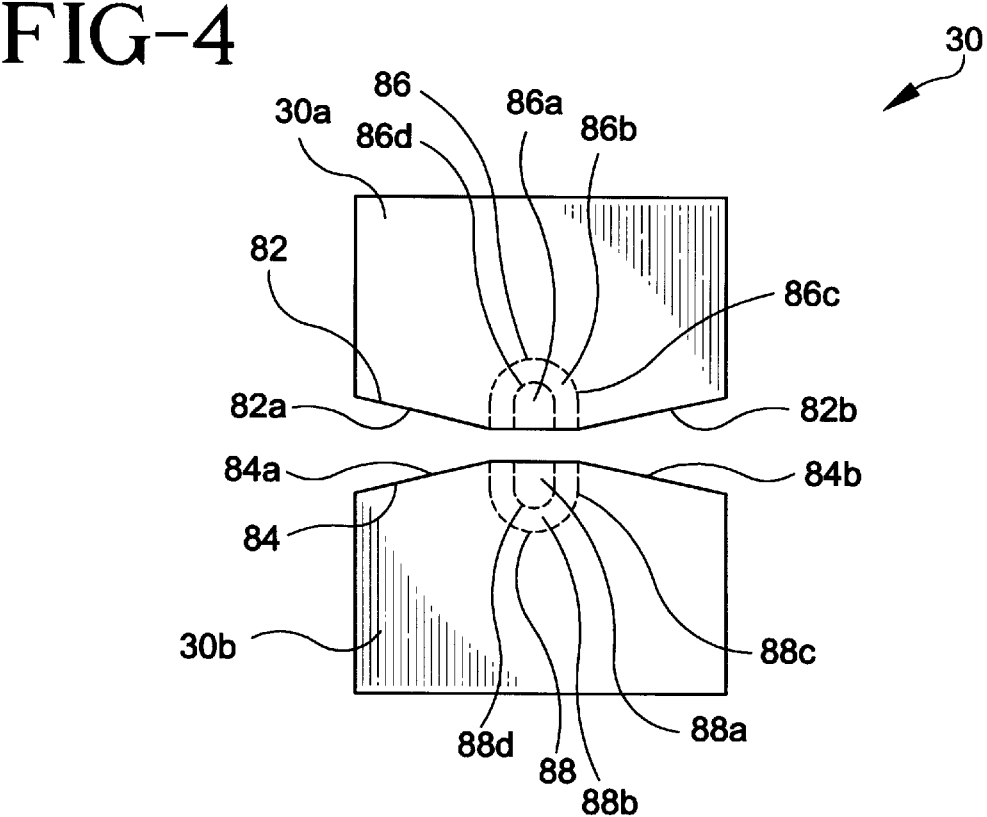
FIGS. 4 and 5 are front elevational showings of a closed-cell foam end seal used in combination with the enclosure of FIG. 2.
Figure 5:
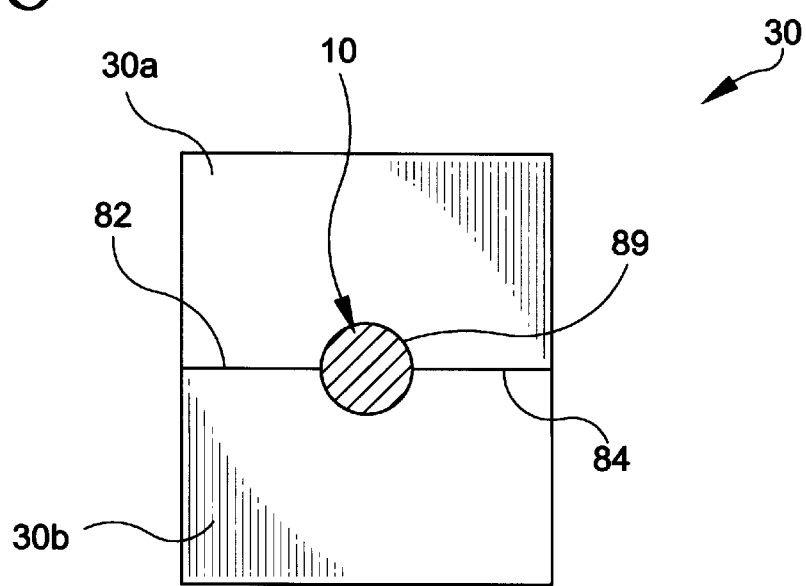

With additional reference to FIGS. 4 and 5, multi-part end seals 30 and 32 may be described. End seal 30 is a generally rectangular two-piece planar member formed of closed cell foam. End seal 30 includes an upper portion 32a and a lower portion 32b which are designed to abut along facing respective edges 82 and 84. Upper and lower portions 30a and 30b are positionable within slot 56 of lower housing portion 24 so as to accommodate cable 10 therebetween in sealed engagement therewith. In order to sealably accommodate cable 10 and to permit cable passage therethrough, upper and lower portion 30a and 30b include aligned centrally located generally semi-circular knock-outs or slugs 86 and 88 respectively. Slugs 86 and 88 are frangibly attached to upper and lower portions 30a and 30b and may be removed so as to create a generally circular opening 89 to permit passage of cable 10 therethrough.

As the cables which may be employed in combination with enclosure 20 of the present invention may vary in size, slugs 86 and 88 each comprise a pair of concentric slug portions 86a, 86b, and 88a, 88b. Referring to upper portion 30a which is generally identical to lower portion 30b, slug portion 86b is frangibly attached to upper portion 30a by four webs of material 86c equally spaced therearound. Slug portion 86a is attached to slug portion 86b by two webs of material, 86d. Thus, slug portion 86a may be removed without removing slug portion 86a. This allows for smaller sized cables to pass through end seal 30. Alternatively, both slug portions 86a and 86b may be removed so as to accommodate a larger sized cable. As slug portion 86a is attached by only two webs of material 86d, it can be removed with less force, thereby allowing slug portion 86b to remain attached. Firm grasping and pulling of both slug portions 86a and 86b provides for removal of both slugs in unison. Thus end seal 30 is range taking in that it permits sealed accommodation of various sized cables 10.

A seal between cable 10 and end seal 30 is provided as abutting edge surfaces 82 and 84 of upper and lower portions 30a and 30b sealingly engage one another adjacent cable 10. To assure such sealing relationship, abutting edges 82 and 84 are cut at an outwardly diverging angle away from the centrally located slugs 86 and 88 so as to define lateral raised areas 82a, 82b and 84a, 84b on each side thereof. These raised areas provide an effective seal at cable 10 when upper portion 30a is interposed over lower portion 30b with cable 10 extending therethrough. The raised areas on each side of opening 89 (after removal of the appropriate slug portions) tightly engage one another, eliminating gap formation about cable 10. As shown in FIG. 5, once abutted, upper portion 30a and lower portion 30b form an effective seal along the abutted edges 82 and 84.

As shown in FIG. 2, end seal 32 is substantially similar to end seal 30 shown in FIG. 4 having upper and lower portions 32a and 32b. Seal 32 comprises a "double seal" for positioning adjacent the side-by-side cable entry openings 60 and 62 to provide a pair of side-by-side cable passages 89a and 89b therethrough. With an in-line splice, only one of the double seals need be employed. As one cable 10 would enter from cable entry opening 54, the associated slug of the passage 89b of seal 32 would remain in place, sealably closing the aligned cable entry opening 62. In a butt splice situation, both passage 89a and 89b would be exposed for cable passage. In this situation, passage 89 of end seal 30a would be closed, sealing cable entry opening 54.

Having described the components of the enclosure 20 of the present invention, use of enclosure 20 of the present invention may now be described.

Prior to formation of the splice 19 in lower housing portion 24, enclosure 20 is provided in partially assembled condition with ground bar 28 positioned against bottom surface 42 and optionally, web-like spacer member 40 adhered to bottom surface 42 over ground bar 28. Lower portion 30b of end seal 30 is then positioned within slot 56 while the lower portion 32b of double end seal 32 is positioned within slot 64. The appropriate size and number of slugs are removed from the end seals 30 and 32 to define passages 89, 89a and 89b, so as to accommodate cables 10 to form either an in-line or butt-splice 19. The cables 10 are passed to the interior of lower housing portion 24. Upon insertion of the cables 10 into the appropriate cable entry openings, the exposed extents of ground shields 14 become engaged with the appropriate engagement elements 74, 75 and 76 of ground bar 28, establishing ground continuity therebetween. The splice 19 may then be made and positioned in the interior 45 of lower housing 24. The ground connection of shield 14 by ground bar 28 provides protection to the installer from electrical surges while making splice 19. The upper portions 32a, 32b of end seals 30 and 32 may then be inserted into slots 56 and 64. The end seals 30 and 32 form effective encapsulant-blocking seals at the cable entry openings, closing the openings and preventing excessive encapsulant escape along the cables and through the openings. Once the splice 19 is made and properly positioned within the lower housing portion 24, cover 26 may be snapped over the open end thereof. The enclosure 20 is now prepared for filling with a curable encapsulant so as to surround and protect splice 19 held therein.

As enclosure 20 is designed for field installation at the site of a break or interruption in telephone service, the installer may have to fill the enclosure in an awkward position. The installer may be working within the hole dug in the ground to expose the damaged cable or be working on uneven terrain. Thus, it is often difficult for the installer to properly hold and maintain the enclosure at an appropriate position to easily fill the enclosure with encapsulant. The present invention assists in the introduction of the encapsulant 21 into the enclosure by providing a pair of encapsulant fill openings 58 and 70 on mutually distinct non-coplanar surfaces of the enclosure. With reference to FIG. 2, the installer may fill the enclosure 20 with encapsulant 21 (FIG. 3) through opening 70 in cover 26 by holding the enclosure flat with cover 26 generally forming the raised surface. Alternatively, enclosure 20 may be filled through fill opening 58 with the enclosure 20 standing on its end with end wall 48 forming the raised surface of the enclosure. In either position, the non-used opening 58 or 70 is closed prior to filling with the appropriate plug 34 or 36. As the encapsulant is preferably a two-part curable liquid encapsulant and as the enclosure is filled under gravity, the flexibility provided by the plural non-coplanar fill openings allows the installer to more easily fill the enclosure, assuring proper and complete encapsulation of the splice, even where the enclosure is filled at an awkward position which may be encountered in the field.

Figure 3:
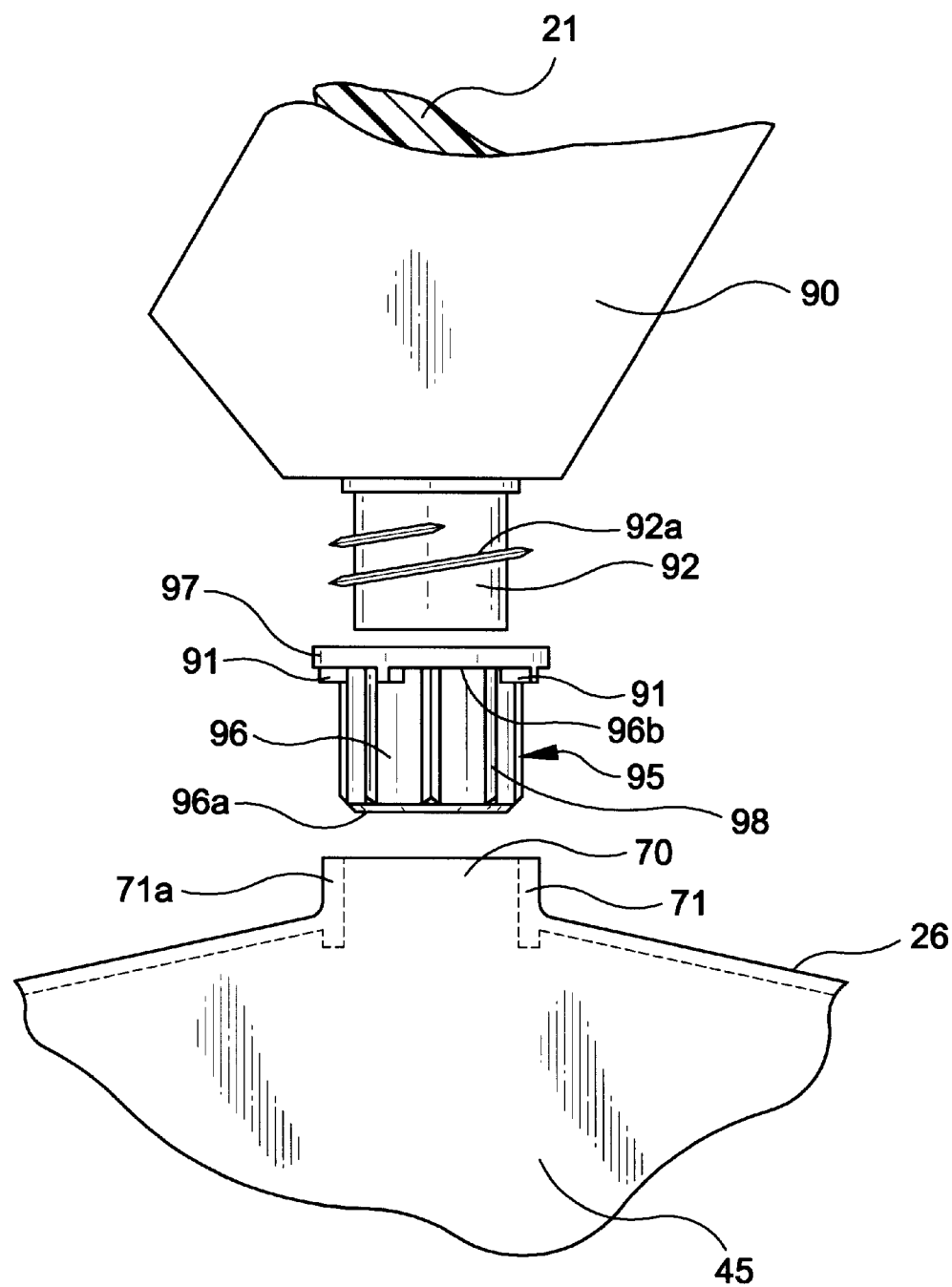
FIG. 3 is an exploded plan view partially in section of the adapter nozzle used to permit filling of the enclosure of FIG. 2 with an encapsulant compound.

FIG. 3 shows one technique for encapsulating enclosure 20 using fill opening 70 in cover 26. Encapsulant 21 is preferably a commercially available two-part liquid encapsulant which once mixed, cures over time to a soft or hard consistency. Commercially available encapsulants of this type may include an encapsulant sold by Resin Technology Group, as Part No. EL013195-2, or an encapsulant sold by Uniroyal under the tradename "TRILENE" 141. Encapsulant 21 is typically provided in a container 90 having a dispensing nozzle 92. Nozzle 92 may be inserted into opening 70 of cover 26 to introduce the encapsulant 21 into the interior 45 of enclosure 20.

Figure 6:
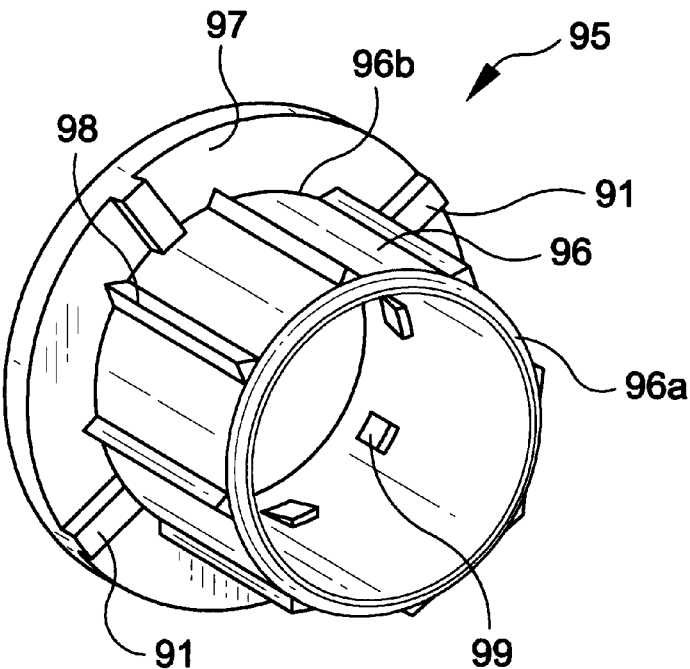
FIG. 6 is a front perspective showing of the adapter nozzle of FIG. 3.

In order to facilitate the attachment of nozzle 92 to enclosure 20 and to speed the introduction of encapsulant 21 thereinto, the present invention provides an optional nozzle adapter 95. Adapter 95, more fully shown in FIG. 6, includes a generally elongate tubular body 96 having an open insertion end 96a and an opposed open connection end 96b. Adapter 95 includes an outwardly directed annular flange 97 adjacent connection end 96b which supports adapter 95 over opening 70. The outer cylindrical surface of tubular body 96 includes a plurality of elongate outwardly extending circumferentially spaced ribs 98 which serve to space the outer surface of tubular body 96 from the annular collar 71 defining opening 70. Also, annular flange 97 includes a plurality of circumferentially spaced depending spacer elements 91 which are provided to space annular flange 97 from the upper circular edge 71a of collar 71. These structures permit air to escape out from enclosure 20 upon filling the enclosure with encapsulant to facilitate the complete filling of enclosure 20 with encapsulant. Adapter 95 further includes a plurality of detent members 99 circumferentially spaced around the internal surface of tubular body 96 adjacent connection end 96b. Detent members 99 permit the removable snap fitting of nozzle 92 therein. As nozzle 92 may include external screw threads 92a, detent members 99 engage the threads to provide removable snap fit attachment of nozzle 92 therein. Once filled with encapsulant 21, container 90 may be removed from opening 70. Nozzle adapter 95 may also be removed allowing plug 36 to be inserted thereinto.

Figure 7:
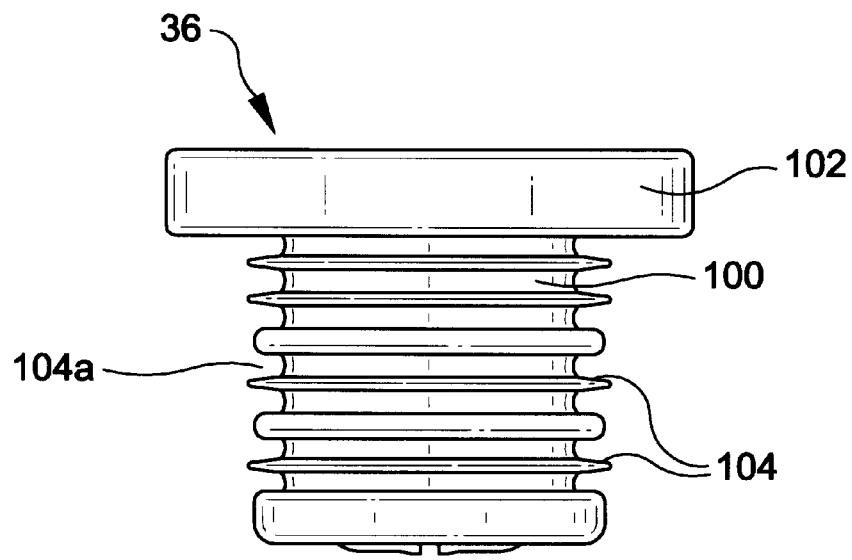
FIG. 7 is a partial plan view of a portion of an alternate embodiment of the present invention, accommodating an encapsulant container.

Referring to FIG. 7, plug 36 is shown in further detail. Plug 36 includes a generally elongate cylindrical body 100 having a disc like upper extent 102. Cylindrical body 100 has a diameter which is slightly less than the diameter of fill opening 70 to permit insertion thereinto. Cylindrical body 100 includes a plurality of vertically spaced annular fins 104 extending therefrom. Fins 104 have a transverse dimension which is slightly greater than the diameter of opening 70 so that upon insertion of plug 36 thereinto, fins 104 frictionally engage the annular wall 71 thereof establishing a frictional fit therebetween. This frictional fit is sufficient to secure plug 36 in fill opening 70.

With additional reference to FIG. 2, as the plug is installed into opening 70, the plug displaces some of the volume of the encapsulant 21 therein, and pressurizes the enclosure causing the encapsulant to further flow into spaces about the cable splice 19 (FIG. 1) assuring complete encapsulation of the splice. In that regard, end wall 50 of lower housing 24 includes a plurality of spaced apart ribs 51 which extend into slot 64. Ribs 51 form spaces or recess 53 between wall 50 and end seal 32 inserted therein. These spaces 53 are provided so as to accommodate encapsulant 21 which is displaced upon insertion of plug 36 into opening 70. This allows for pressurization of enclosure 20, while reducing the escape of encapsulant out of the enclosure. Further, once plug 36 is seated in opening 70, the encapsulant 21 is caused to flow within the spaces 104a between fins 104. Thus, upon curing, the hardened encapsulant 21 between the spaces 104a also serves to secure the plug 36 within fill opening 70.

As may be appreciated, the description is made with respect to the use of fill opening 70 through cover 26. It may be appreciated that the same technique may be used to fill enclosure 20 using fill opening 58 and plug 34.

Figure 8:
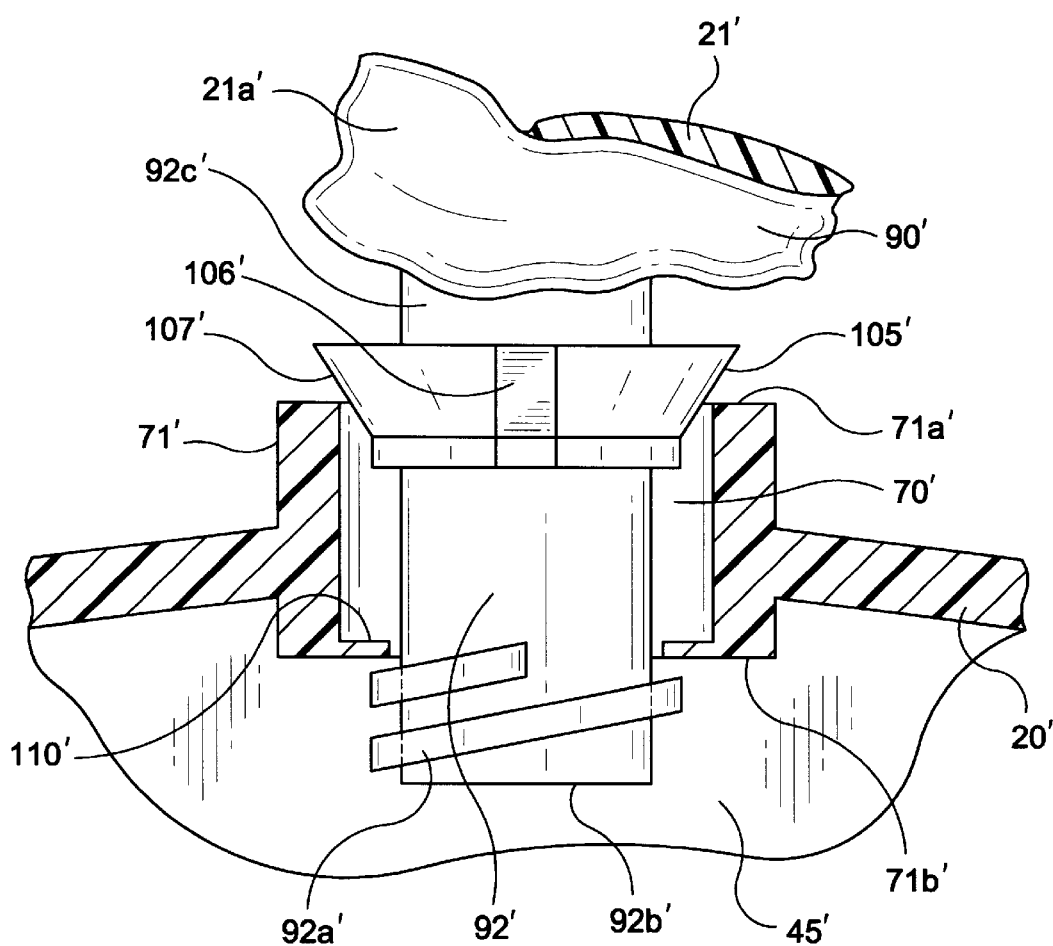
FIG. 8 is a top plan view of the encapsulant fill opening of the embodiment of FIG. 7.
Figure 9:
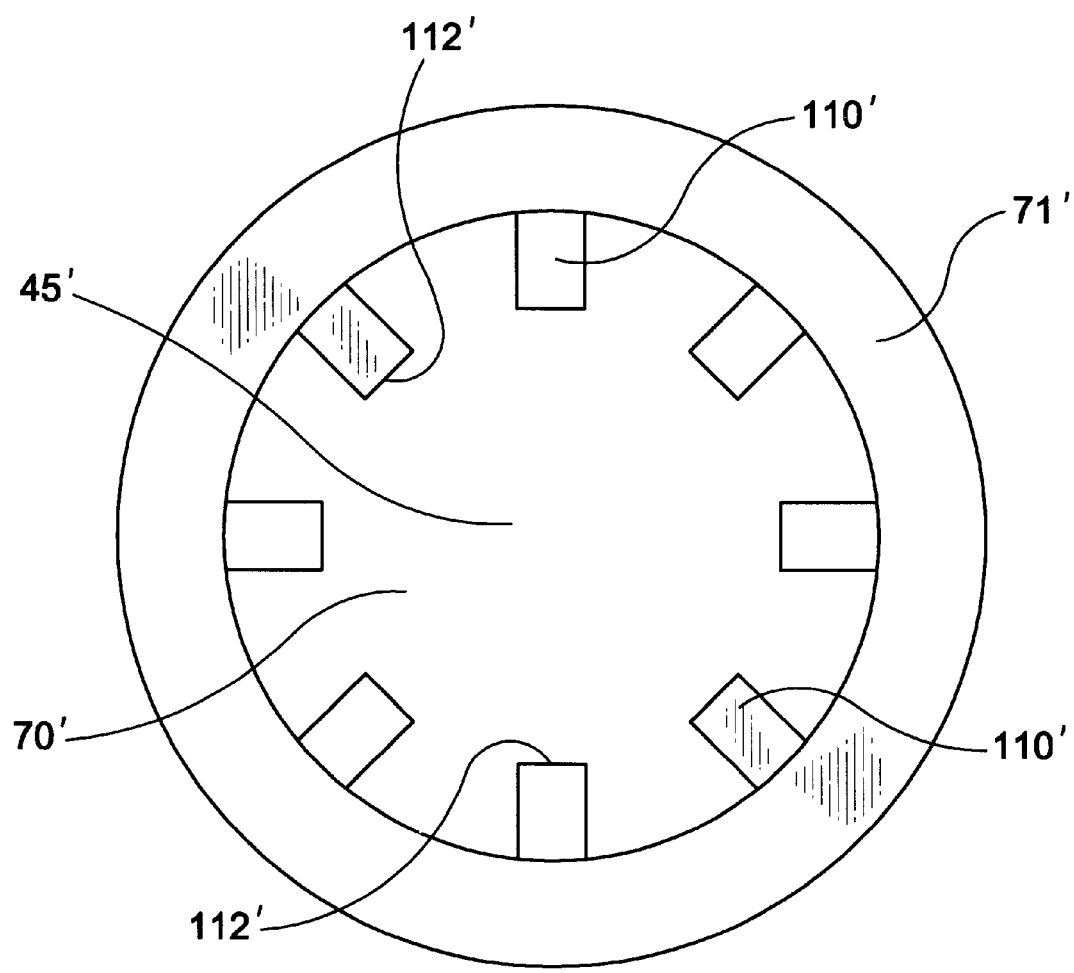
FIG. 9 is a top view of the encapsulant till opening of the embodiment of FIG. 8.

An alternate embodiment of the present invention is shown in FIGS. 8 and 9. Enclosure 10 (FIG. 2) may include a cover 20' having an opening 70' which accommodates an encapsulant container 90' without need for use of nozzle adapter 95 shown in FIG. 3. Certain commercially available encapsulant containers are provided with a skirt member adjacent the nozzle which itself incorporates an air gap therein, thus obviating the need for the air passage to be provided by adapter 95.

As shown in FIG. 8, a container 90' which contains a curable encapsulant 21', includes an elongate nozzle 92' having external screw threads 92a' therearound. Nozzle 92' includes an insertion end 92b' and a proximal end 92c' adjacent the body 21a' of container 21'. Nozzle 92' further includes a frusto-conically shaped skirt member 105' adjacent proximal end 90b'. Skirt member 105' tapers inwardly towards insertion end 92b' of nozzle 92' so as to assist in the location and insertion of the nozzle 92' into opening 70' of cover 20'. The tapered side wall 107' of skirt member 105' seats against the upper circular edge 71a' of collar 71' thereby centrally locating nozzle 92' within opening 70.

In order to permit air passage through opening 70' skirt member 105' includes a pair of diametrically opposed longitudinal slots 106' therethrough. Slots 106' permit air escape through opening 70' upon filling the enclosure with encapsulant 21'.

In order to retain container 90' within opening 70' during filling, the present embodiment includes a plurality of circumferentially spaced inwardly directed deflectable fingers 110' extending from a lower edge 71b' of collar 71'. As further shown with additional reference to FIG. 9, fingers 110' extend inwardly a sufficient distance so that their distal extents 112' engage screw threads 92a' of nozzle 92' upon insertion thereinto. The particular location and spacing of fingers 110' is such that upon seating of skirt 105' against collar 71', the screw threads 92a' snap past fingers 110' thereby providing for the retention of container 90' within opening 70'.

After the filling of the enclosure with encapsulant 21', the container 90' may be removed by withdrawing the nozzle 92' from opening 70' and snapping the screw threads 92a' past fingers 110'. Once the enclosure has been filled with encapsulant and the container 90' has been removed, opening 70 may be closed by insertion of plug 36 thereinto in a manner described above with respect to FIGS. 2 and 7.

Various changes to the foregoing described and shown structures would now be evident to those skilled in the art. Accordingly, the particularly disclosed scope of the invention is set forth in the following claims.

What is claimed is:

1. An electrical splice enclosure for enclosing a splice of an electrical cable comprising:
   an enclosure housing including:
   at least two encapsulant fill openings, said fill openings extending through separate non-coplanar, non-parallel surfaces of said enclosure for permitting said housing to be gravity filled with an encapsulant with said housing being positioned in one of at least two distinct housing filling positions; and
   wherein said enclosure housing further includes:
   a lower housing portion including a bottom surface, an upwardly extending wall bounding said bottom surface, an upper open surface opposite said bottom surface, said lower housing portion including a cable entry opening through said wall for permitting entry of said cable into said lower housing portion; and
   a cover portion for enclosing said open upper surface of said lower housing portion and defining a bounded housing interior therewith;
   said cover portion and said wall each including one of said at least two encapsulant fill openings for permitting said housing interior to be gravity filled with said encapsulant through either of said at least two openings.

2. An enclosure of claim 1 wherein said cover portion includes a generally planar surface positionable parallel to and spaced from said bottom surface of said lower housing portion and generally perpendicular to said wall and wherein one of said encapsulant fill openings extends through said planar cover portion surface.

3. An enclosure of claim 2 wherein said enclosure housing is generally an elongate rectangular member and wherein said wall includes an opposed pair of transverse end walls and an opposed pair of longitudinal side walls and wherein one of said end walls includes said encapsulant fill opening extending therethrough.

4. An enclosure of claim 3 wherein one of said at least two housing filling positions includes said planar cover surface being raised above said bottom surface.

5. An enclosure of claim 4 wherein the other of said at least two housing filling positions includes said one end wall being raised above the other said end wall.

6. An enclosure of claim 1 further including a pair of plugs, each of said plugs insertable into one of said encapsulant fill openings.

7. An enclosure of claim 6 wherein each of said encapsulant fill openings is generally circular, defined by an annular surface and wherein each of said plugs includes a plug portion frictionally engagable with said annular surfaces.

8. An enclosure of claim 6 wherein at least one of said plugs includes an elongate cylindrical body insertable into said housing through said fill opening for displacing said encapsulant upon the insertion thereinto to pressurize said enclosure and to place said encapsulant into engagement with said splice.

9. An enclosure of claim 7 wherein said plug portion includes a generally cylindrical body having a diameter less than the diameter of said circular encapsulant fill opening and a plurality of spaced apart annular fins extending outwardly from said cylindrical body, said annular fins being engagable with said annular surface for frictionally retaining said plug therein.

10. An enclosure of claim 9 wherein said spaced apart fins of said plug defining encapsulant accommodating regions therebetween.

11. An enclosure of claim 10 wherein said housing further includes cable sealing means for sealably closing said cable entry opening, said cable sealing means further including means for permitting passage of said cable through said sealing means.

12. An enclosure of claim 11 wherein said cable sealing means includes a closed cell foam structure positioned adjacent said cable entry opening.

13. An enclosure of claim 12 wherein said closed cell foam structure includes a pair of foam elements which are matable along abutting edges, each of said edges including aligned centrally located semi-circular removable slugs, each of said slugs being removable to create a circular passageway therethrough defining said means for permitting passage of said cable therethrough.

14. An enclosure of claim 13 wherein each of said slugs is frangibly attached to each of said elements.

15. An enclosure of claim 14 wherein each of said slugs includes first and second slug portions, said first slug portion being frangibly attached to said element and said second slug portion being frangibly attached to the first slug portion for removal of said second slug portion alone or for removal of both said first slug portion and said second slug portion.

16. An enclosure of claim 14 wherein said abutting edges of each foam element include abutting longitudinal edge portions positioned on each side of said removable slug, said edge portions outwardly diverging away from said slug.

17. A method of encapsulating an electrical cable splice comprising the steps of:
   enclosing said cable splice in a splice enclosure, said splice enclosure including at least two encapsulant introduction openings, said openings extending through separate non-coplanar, non-parallel surfaces of said enclosure;

positioning said enclosure such that one of said surfaces is positioned at a generally raised elevation;

introducing a curable encapsulating compound into said enclosure through said opening located in said one of said surfaces;

filling said enclosure with said compound; and plugging said opening located in said one of said surfaces after said enclosure is filled; and wherein said enclosing step includes:

providing an elongate lower housing having a bottom wall, upstanding longitudinal side and end walls bounding said bottom wall and defining an open upper surface; and providing a cover for covering said open upper surface, said cover and said lower housing defining said splice enclosure.

18. A method of claim 17 wherein one of said encapsulant introduction openings extends through one of said end walls and the other of said encapsulant introduction openings extends through said cover.

19. A method of claim 18 wherein said positioning step includes:

positioning said enclosure such that said one end wall is said raised surface.

20. A method of claim 18 wherein said positioning step includes:

positioning said enclosure such that said cover is said raised surface.

21. In an encapsulated cable splice enclosure including an enclosure housing having a cable entry opening and an encapsulant fill opening for introduction of encapsulant thereinto, a sealing device for sealing said cable entry opening comprising:

a pair of sealing elements, each captively retained in said enclosure adjacent said cable entry opening;

said pair of sealing elements including mutually abutting longitudinal edges defining a central cable passage location therebetween for permitting passage of a cable therethrough;

each of said mutually abutting edges including a pair of elongate lateral edge extents, each of said edge extents extending from said central location, said abutting edge extents of said pair of sealing elements diverging from said central location to thereby define a raised engagement location adjacent said central location for providing a seal about said cable.

22. A sealing device of claim 21 wherein each of said mutually abutting edges of said pair of sealing elements includes a semi-circular recess at said central location, said semi-circular recess of said edges being aligned to define a generally circular cable passage opening therebetween.

23. A sealing device of claim 21 wherein each of said mutually abutting edges of said pair includes a frangibly removable slug at said central location, said frangibly removable slug of said edges being aligned so that said removal of said slugs creates a cable passage opening therebetween.

24. A sealing device of claim 23 wherein each of said slugs of each of said sealing elements includes a first slug portion frangibly attached to said element and a second slug portion frangibly attached to said first slug portion.

25. A sealing device of claim 24 wherein said second slug portion is frangibly removable from said first slug portion with a removal force less than the removal force necessary to frangibly remove said first slug portion from said element.

26. A sealing device of claim 24 wherein said first slug portion is generally semi-annular in shape and said second slug portion is generally semi-circular in shape and concentric with said first slug portion.

27. A sealing device of claim 25 wherein said first slug portion is frangibly attached to said element by a plurality of first interconnecting webs and wherein said second slug portion is frangibly attached to said first slug portion by a plurality of second interconnecting webs.

28. A sealing device of claim 27 wherein the number of said first interconnecting webs exceeds the number of said second interconnecting webs.

29. An enclosure for an electrical cable splice comprising:

an enclosure housing for containing said splice, said enclosure having an opening therethrough;

an encapsulant contained within said housing for encapsulating said splice;

a plug positionable within said opening for closing said opening, said plug including an elongate plug body insertable into said housing so as to displace said encapsulant and pressurize said enclosure;

said plug further including an upper plug extent at one end of said plug body for closing said opening; and wherein said plug body includes a plurality of outwardly directed, longitudinally spaced fins, said fins being deformable for frictionally engaging an enclosure wall about said opening and defining encapsulant accommodating regions therebetween for securing the plug within the opening upon hardening of the encapsulant.

* * * * *